United States Patent
Gertner et al.

[11] Patent Number: 6,032,122
[45] Date of Patent: Feb. 29, 2000

[54] SYSTEMS, METHODS AND COMPUTER PROGRAM PRODUCTS FOR MONITORING AND CONTROLLING MAIL PROCESSING DEVICES

[75] Inventors: Patricia Ann Gertner, Raleigh, N.C.; William Allen Sterling, North Hollywood, Calif.

[73] Assignee: Bell & Howell Mail and Messaging Technologies Company, Durham, N.C.

[21] Appl. No.: 09/016,715

[22] Filed: Jan. 30, 1998

Related U.S. Application Data

[60] Provisional application No. 60/040,520, Mar. 14, 1997.

[51] Int. Cl.[7] .................................................. G06F 17/60
[52] U.S. Cl. ........................... 705/8; 345/326; 345/333; 345/334; 700/9; 700/11; 700/17; 700/95; 700/100
[58] Field of Search ..................................... 345/326, 333, 345/334, 348; 364/138, 140.01, 146, 188, 191, 192, 400, 468.01, 468.06, 468.09; 705/1, 7, 8, 9; 700/9, 11, 17, 95, 100

[56] References Cited

U.S. PATENT DOCUMENTS

| | | | |
|---|---|---|---|
| 3,522,588 | 8/1970 | Clarke, Jr. et al. | 340/825.06 |
| 3,582,621 | 6/1971 | Lawler | 364/138 |
| 4,346,446 | 8/1982 | Erbstein et al. | 702/182 |
| 4,517,637 | 5/1985 | Cassell | 364/138 |
| 4,752,950 | 6/1988 | Le Carpentier | 379/106.11 |
| 4,798,040 | 1/1989 | Haas et al. | 53/460.77 |
| 4,837,701 | 6/1989 | Sansone et al. | 705/405 |
| 4,903,456 | 2/1990 | Meur | 53/69 |
| 4,908,768 | 3/1990 | Gelfer et al. | 364/464.03 |
| 4,926,612 | 5/1990 | Krasuski et al. | 53/69 |
| 5,021,976 | 6/1991 | Wexelblat et al. | 364/521 |
| 5,305,055 | 4/1994 | Ebner et al. | 399/9 |
| 5,309,556 | 5/1994 | Sismilich | 395/161 |
| 5,408,603 | 4/1995 | Van de Lavoir et al. | 395/161 |
| 5,424,956 | 6/1995 | Akamaru | 364/478 |
| 5,448,693 | 9/1995 | Blades et al. | 395/159 |
| 5,470,218 | 11/1995 | Hillman et al. | 425/144 |
| 5,471,399 | 11/1995 | Tanaka et al. | 364/491 |
| 5,518,122 | 5/1996 | Tilles | 209/539 |
| 5,559,691 | 9/1996 | Monta et al. | 364/188 |
| 5,611,059 | 3/1997 | Benton et al. | 395/326 |
| 5,628,249 | 5/1997 | Cordery et al. | 101/91 |
| 5,630,081 | 5/1997 | Rybicki et al. | 395/348 |
| 5,631,825 | 5/1997 | van Weele et al. | 364/188 |
| 5,638,522 | 6/1997 | Dunsmuir et al. | 395/326 |
| 5,649,408 | 7/1997 | Mazeiller | 53/460 |
| 5,650,800 | 7/1997 | Benson | 345/173 |
| 5,650,934 | 7/1997 | Manduley | 364/478.08 |
| 5,659,481 | 8/1997 | Qutub et al. | 364/478.08 |
| 5,684,706 | 11/1997 | Harman et al. | 364/464.16 |
| 5,812,394 | 9/1998 | Lewis et al. | 364/146 |
| 5,859,778 | 1/1999 | Kuroda et al. | 364/474.11 |
| 5,870,698 | 2/1999 | Riedel et al. | 702/182 |

*Primary Examiner*—Edward R. Cosimano
*Attorney, Agent, or Firm*—Jenkins & Wilson, P.A.

[57] ABSTRACT

Systems, methods, and computer program products for managing a plurality of mail processing devices are provided. A mail insertion device is represented on a computer display as an interactive icon. Visible indicia is associated with each icon for displaying in real time operational status information about the mail inserting machine represented by the icon. The indicia changes appearance in response to a change in the operation related information received from the respective mail insertion machine. Each interactive icon is responsive to user actions for displaying selective operation related information about a respective mail insertion device.

60 Claims, 12 Drawing Sheets

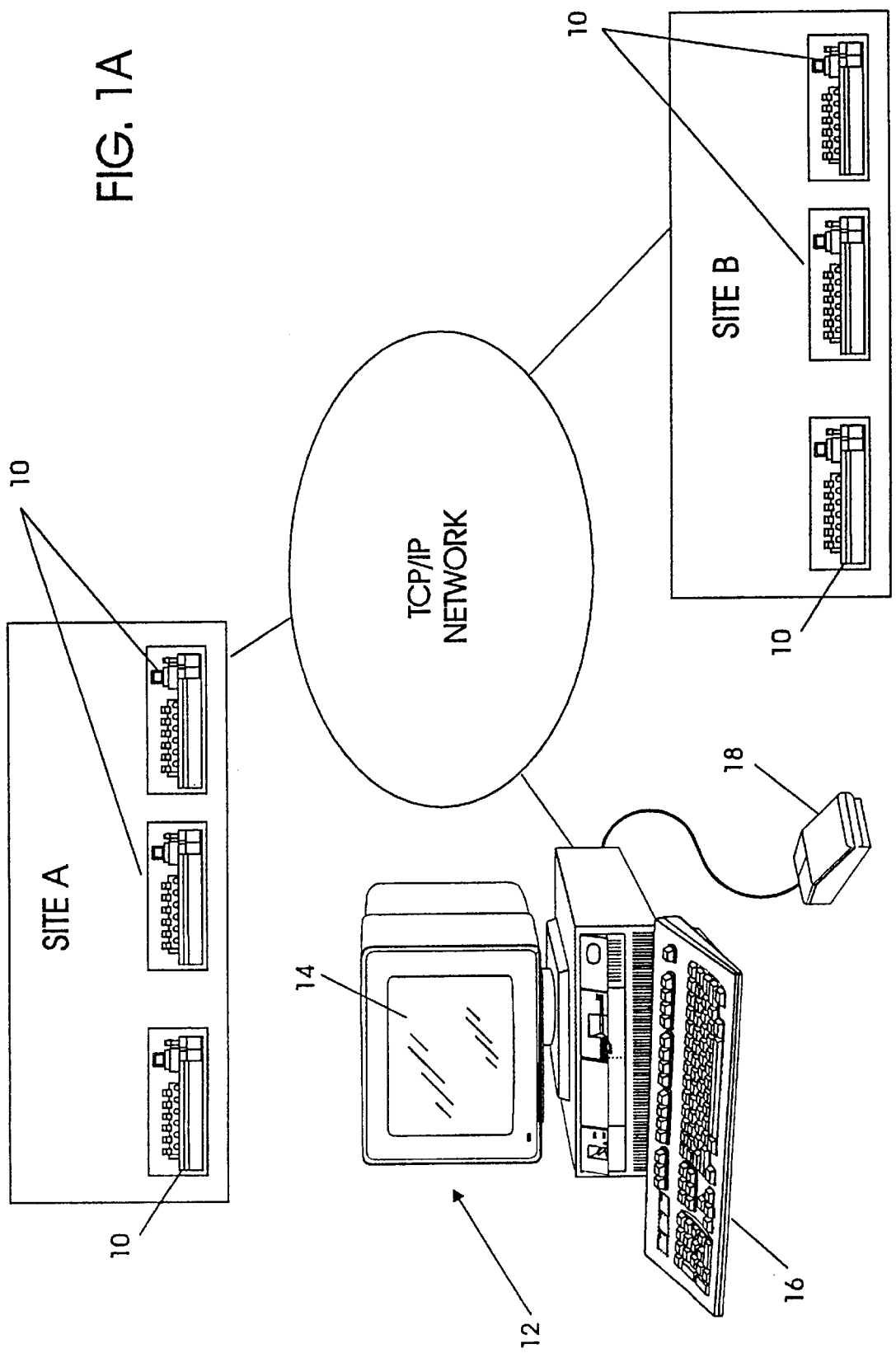

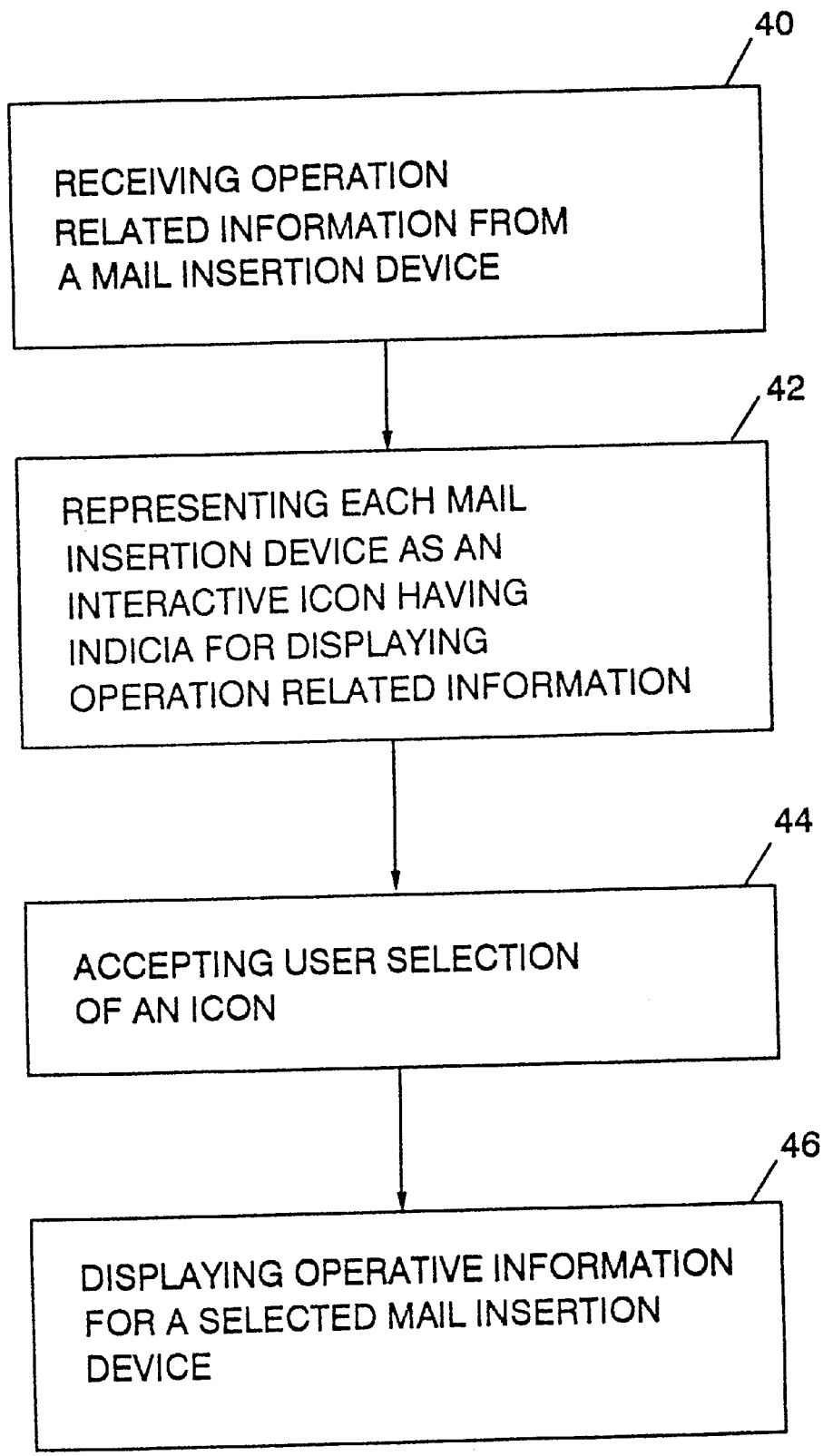

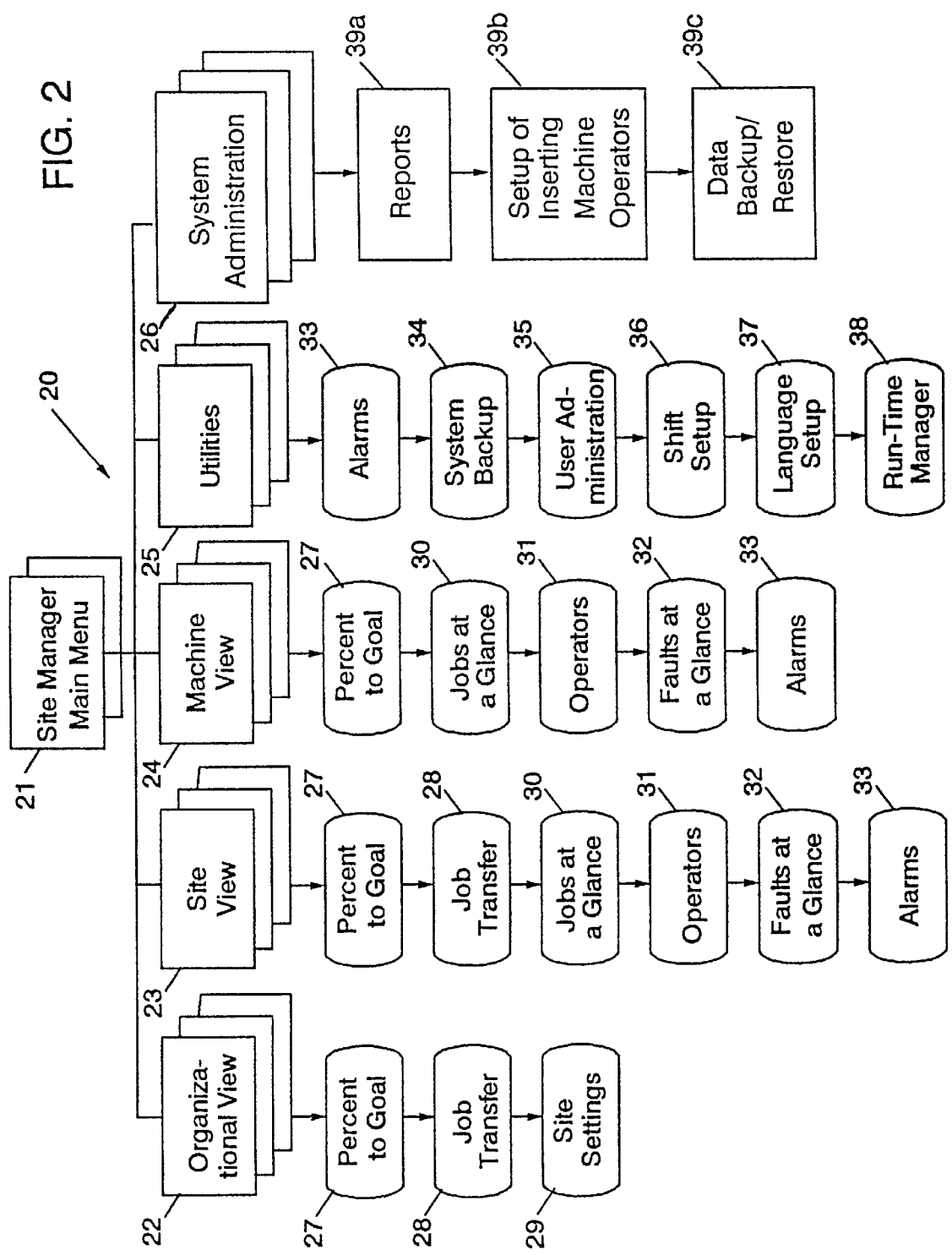

SYSTEMS, METHODS AND COMPUTER PROGRAM PRODUCTS FOR MONITORING AND CONTROLLING MAIL PROCESSING DEVICES

This application claims the benefit of U.S. Provisional Patent Application Ser. No. 60/040,520 filed Mar. 14,1997.

FIELD OF THE INVENTION

The present invention relates generally to mail processing equipment and more particularly to automated mail processing systems.

BACKGROUND OF THE INVENTION

Customized, high volume mail processing systems are used by financial institutions, insurance companies, public utilities, and various other businesses to prepare and mail letters and packages. Mail processing systems include mail inserting systems, sorting systems, and a range of modular attachments for increasing the productivity of large scale mail production operations. Mail insertion systems include a device known as a mail inserter, which physically "stuffs" individual envelopes with the appropriate contents. Many businesses, such as financial institutions and public utilities, often produce voluminous mailings on a routine basis. As such, mailings are often performed at various locations to reduce the load on any given location and to be closer to the destination of the mailings.

Unfortunately, monitoring and controlling remotely-located high volume mailing systems with existing control systems may be difficult. Existing control systems may not readily facilitate monitoring multiple remotely-located mailing systems from a central location. Furthermore, existing control systems may not readily facilitate monitoring various operating performance indicators of individual mail inserter devices within multiple remotely-located mailing systems.

SUMMARY OF THE INVENTION

It is therefore an object of the present invention to facilitate the monitoring and controlling of remotely-located high volume mailing systems from a central location.

It is another object of the present invention to facilitate the monitoring of various operating performance indicators of individual mail inserter devices within multiple remotely-located mailing systems.

The present invention includes systems, methods, and computer program products for managing a plurality of mail processing devices. Operation related information is received from a mail processing device such as a mail insertion machine. Each mail insertion device is represented on a display as an interactive icon. Visible indicia is associated with each icon for displaying in real time operational status information about the mail inserting machine represented by the icon.

The indicia changes appearance in response to a change in the operation related information received from the respective mail insertion machine. The indicia is displayed as a color selected from a plurality of colors, wherein each color represents a respective operational condition of the mail insertion device. Each interactive icon can be displayed in a manner depicting the geographical location of each mail insertion device. Interactive icons can be added, deleted, and their location and appearance on the display can be modified.

According to another aspect of the present invention, each interactive icon is responsive to user actions for displaying selective operation related information about a respective mail insertion device. Each interactive icon accepts user selections via an input device. When the user activates an interactive icon, various operational information about the mail insertion device represented by the icon is displayed.

This operational information may include machine status, fault information, and various other types of information related to the operation and performance of the mail insertion device. Information about the operator of the mail insertion device may also be available.

The present invention is advantageous because users can be provided with the ability to monitor and control multiple insertion systems. Furthermore, the various stages of the insertion process can be controlled and monitored in real time. The present invention can facilitate managing automated mail processing systems to increase productivity and decrease costs associated with insertion. The present invention is also advantageous because multiple insertion systems containing different types of insertion equipment can be monitored and configured centrally.

BRIEF DESCRIPTION OF THE DRAWINGS

FIG. 1A a schematic diagram of a system for monitoring and controlling multiple mail processing systems, in accordance with the present invention FIG. 1B schematically illustrates operations for managing a plurality of mail insertion devices, according to the present invention.

FIG. 2 schematically illustrates a hierarchical arrangement of computer screens for managing a plurality of mail insertion devices, according to the present invention.

FIG. 11 illustrates a pop-up screen for selecting a language for text to be displayed in.

DETAILED DESCRIPTION OF REFERRED EMBODIMENTS

Figure 3:
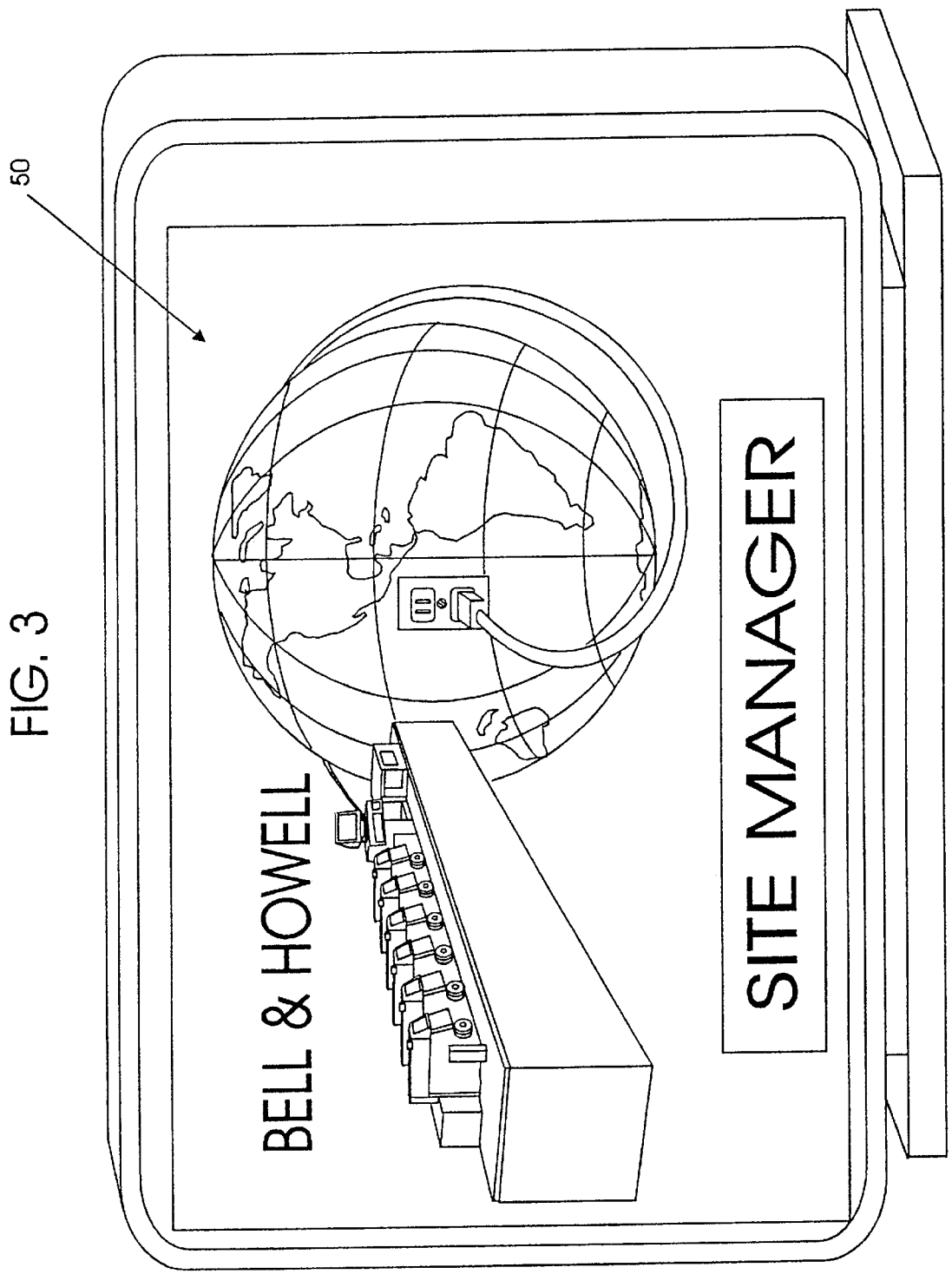
FIG. 3 illustrates a startup screen presented to the user upon startup of the present invention.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

The present invention is described below with reference to flowchart illustrations of methods, apparatus (systems) and computer program products according to the invention. It will be understood that each block of the flowchart illustrations, and combinations of blocks in the flowchart illustrations, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

In a conventional mail processing system, mail inserting machines (also referred to hereinafter as insertion machines or insertion devices) are utilized for stuffing inserts into awaiting envelopes.

Thereafter, the stuffed envelopes are sealed and various other operations associated with mail processing are performed. Insertion machines typically operate at high speeds and can often stuff ten thousand (10,000) envelopes or more per hour. An exemplary insertion machine is described in Applicants' issued U.S. Pat. No. 4,798,040 to Haas et al., the disclosures of each being incorporated herein by reference.

Referring now to FIG. 1A, a schematic diagram of multiple mail insertion machines monitored and controlled by computer systems, methods and computer program products, in accordance with the present invention, is illustrated. Sites A and B each have one or more mail insertion machines 10 and are monitored and controlled via the present invention operating on computer system 12. Computer system 12 includes a display 14 for visually displaying information to a computer user, a central processing unit (CPU) and internal memory. Keyboard 16 and mouse 18 allow the user to provide input to the central processing unit. With the mouse 18, the user may move a pointer on the display 14 to an area displaying an object. By pressing and releasing a button on the mouse 18 while the pointer is in the area displaying the object or icon, the user "activates" the icon. This is also referred to hereinafter as "clicking on" an icon. Computer system 12, serves as data processing means for transmitting and receiving information from and to each mail insertion machine 10 and displaying same via display 14. Other computing systems, including mainframe computing systems, may be utilized to facilitate communicating with the various mail processing devices being monitored and controlled.

The present invention may be stored in computer system 12, either within internal memory or on internal disk storage. The present invention may also be stored on computer readable media and used therefrom by computer system 12. As will be described in detail below, the present invention alters the operation of computer system 12, allowing it to monitor and control a plurality of mail insertion devices in real time.

Referring now to FIG. 1B, operations for managing a plurality of mail insertion devices, according to one aspect of the present invention, is illustrated. Operations include receiving operation related information from mail insertion devices (Block 40); representing each of the mail insertion devices as an interactive icon having indicia for displaying operation related information for a respective mail insertion device (Block 42); accepting selection of an interactive icon (Block 44); and displaying operating status for the selected mail insertion device (Block 46). It is to be understood that a user does not necessarily have to select an icon to view information about a particular mail insertion device. Various information relating to a mail insertion device may be automatically updated and displayed. The operations illustrated in FIG. 1B may be performed in the various "views" described in detail below using FIGS. 2–11.

Referring now to FIG. 2, a hierarchical arrangement 20 of computer screens for facilitating management of a plurality of mail insertion devices, according to the present invention, is illustrated. From a main menu 21 presented to the user on a computer is display, the user may select an "Organizational View" 22 of multiple sites having mail insertion machines, a "Site View" 23 of individual sites having mail insertion machines, and a "Machine View" 24 of individual insertion machines at a particular site.

Various screens containing operating information are available from each of the respective Organizational View, Site View, and Machine View screens 22, 23, 24. For example, the user may access the "Percent to Goal" screen 27, the "Job Transfer" screen 28, and the "Site Settings" screen 29 from the Organizational View screen 22. The user may access the "Percent to Goal" screen 27, the "Job Transfer" screen 28, the "Jobs at a Glance" screen 30, the "Operators" screen 31, the "Faults at a Glance" screen 32, and the "Alarms" screen 33 from the Site View Screen 23. The user may access the "Percent to Goal" screen 27, the "Jobs at a Glance" screen 30, the "Operators" screen 31, the "Faults at a Glance" screen 32, and the "Alarms" screen 33 from the Machine View Screen 23. Each of these screens, and the information presented thereby, are described in detail below.

The user may select (i.e., run) various utility programs via screens accessible via the "Utilities" screen 25 such as the "Alarms" screen 33, the "System Backup" screen 34, the "User Administration" screen 35, the "Shift Setup" screen 36, the "Language Setup" screen 37, and the "Run-Time Manager" screen 38. In addition, the user may perform various administrative tasks via the "Systems Administration" screen 26 such as the "Reports" screen 39a, the "Setup of Inserting Machine Operators" screen 39b, and the "Data Backup/Restore" screen 39c. Each of these screens, and the information presented thereby, are described in detail below.

Logo Screen and Log-In

The initial screen on the user's display, when the present invention is initiated on a computer, is preferably a logo or start-up screen 50 such as that illustrated in FIG. 3. Clicking at any point on the start-up screen 50 preferably activates a login procedure via a pop-up screen. For security reasons, it is preferred that the user enter a user name and password in order to proceed. As would be understood by those having skill in the art, options available to a user upon login may depend on permissions assigned to the particular user.

Once properly logged in, the present invention allows users to view various operational and performance information about multiple remotely-located mail insertion machines. Users are presented with a hierarchy of views depicting organizational, site, and machine-specific perspectives of their mail insertion machines. The user can display text throughout the various screens in a variety of languages including, but not limited to, English, Spanish, French, Italian, German and Dutch. Preferably, a language can be selected via a pop-up screen such as that illustrated in FIG. 11. Each hierarchical view will be described below in detail.

Each view screen, organizational, site and machine, also presents the user with various toolbars containing icons for performing various functions. In the embodiment of the Organizational View Screen illustrated in FIG. 4, two toolbars 62 and 64 are presented to the user. Each toolbar contains icons for performing specific functions. Preferably, toolbars 62 and 64 are presented to the user with the same configuration in all views in order to maintain a consistent and easy to use interface.

Table 1 below describes the function of each of the icons contained within toolbar 62.

TABLE 1

| Icon # | Icon Name | Icon Function |
| --- | --- | --- |
| 62a | Add Site | Add a site. |
| 62b | Edit Site | Edit a selected site. |
| 62c | Delete Site | Delete a selected site. |
| 62d | Percent to Goal | Access the Percent to Goal panel. |
| 62e | Job Transfer | Access the Job Transfer/Host connection panel. |

Table 2 below describes the function of each of the icons contained within toolbar 64.

TABLE 2

| Icon # | Icon Name | Icon Function |
| --- | --- | --- |
| 64a | Organizational View | Display all sites currently configured |
| 64b | Site View | Display the site settings for a selected site. |
| 64c | Machine View | Display all the machines defined at a particular site. |

TABLE 2-continued

| Icon # | Icon Name | Icon Function |
| --- | --- | --- |
| 64d | Utilities | Display the Alarms panel. Access other Utilities. |
| 64e | System Administration | Access various system administration tasks. |
| 64f | Back | Return to the previous panel. |
| 64g | Log off | Log out and return to main panel. |
| 64h | Help | Access help panels. |

It is understood that additional graphic designs may be utilized as for each icon without departing from the spirit and intent of the present invention.

Organizational View

Figure 4:
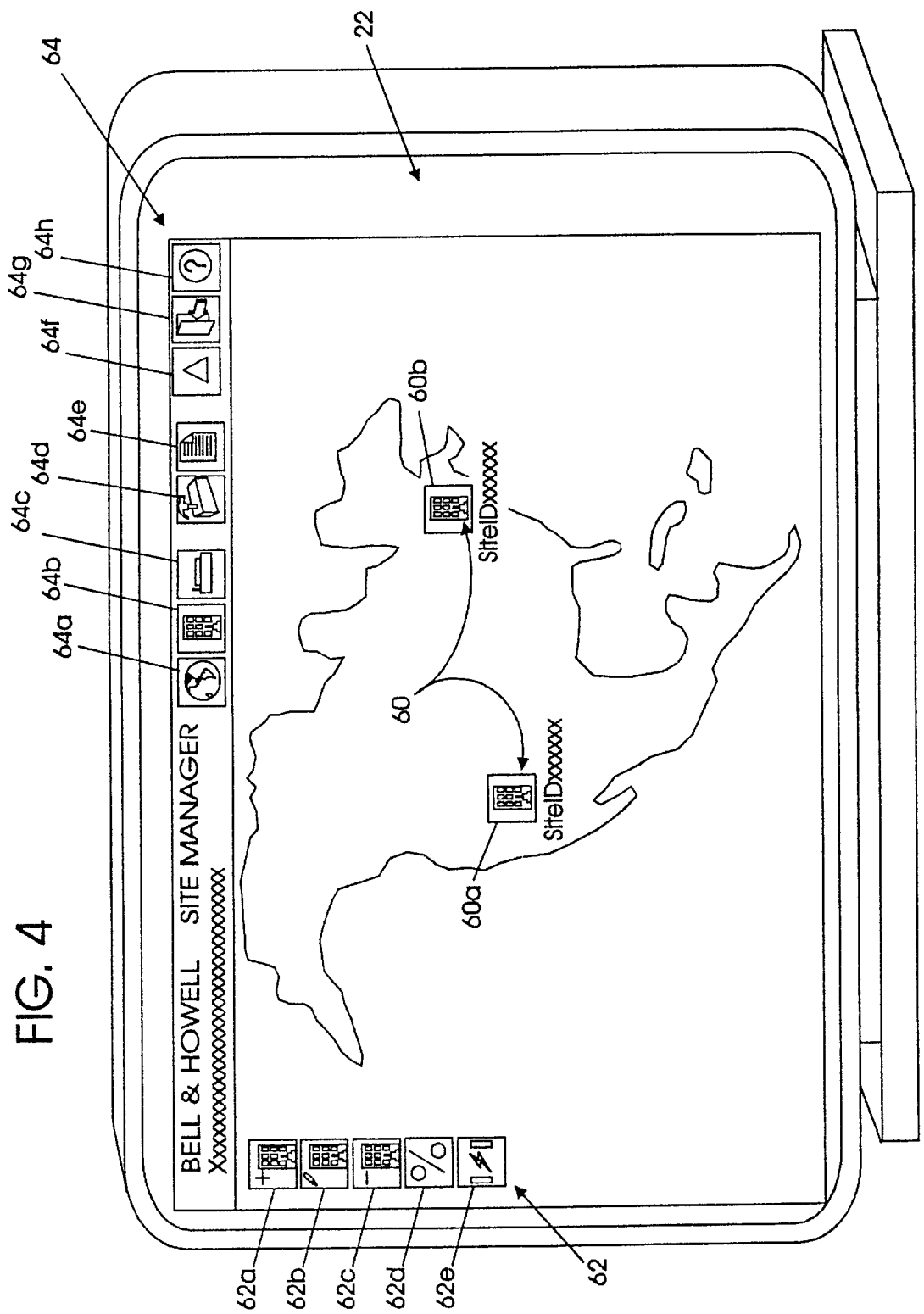
FIG. 4 illustrates an Organizational View screen according to the present invention.

The Organizational View screen 22, illustrated in FIG. 4, preferably includes a geographical background on which the user can place up to twelve (12) sites having mail insertion machines in a geographically oriented arrangement. Although the illustrated embodiment depicts North America as the background, it is to be understood that any geographical depiction is possible using the present invention. Furthermore, no geographical background may be presented if so desired by the user. In the case where users do not have multiple sites, the organizational view can be deactivated and removed from the screen hierarchy.

The Organizational View screen 22 allows the user to display site icons 60 for each site having mail insertion machines. In the illustrated embodiment, site icon 60a represents a site on the west coast of the United States and site icon 60b represents a site on the east cost of the United States. The user will be able to activate each site icon 60a, 60b and be advanced to "Site View" for the respective site, as described in detail below.

The user can add, delete and modify is information associated with each site by "clicking on" or otherwise activating the respective site icon 60 and then clicking on or otherwise activating the respective add, edit, or delete icons 62a, 62b, 62c. If the user is modifying a site, a pop-up window with the selected site's information appears on the screen for editing when icon 62b is activated. If the user is deleting a site, the site icon will simply disappear from the screen when icon 62c is activated. To add a site, the user activates icon 62a and a pop-up window, designed to receive input from the user, appears on the screen.

Site View

Figure 5:
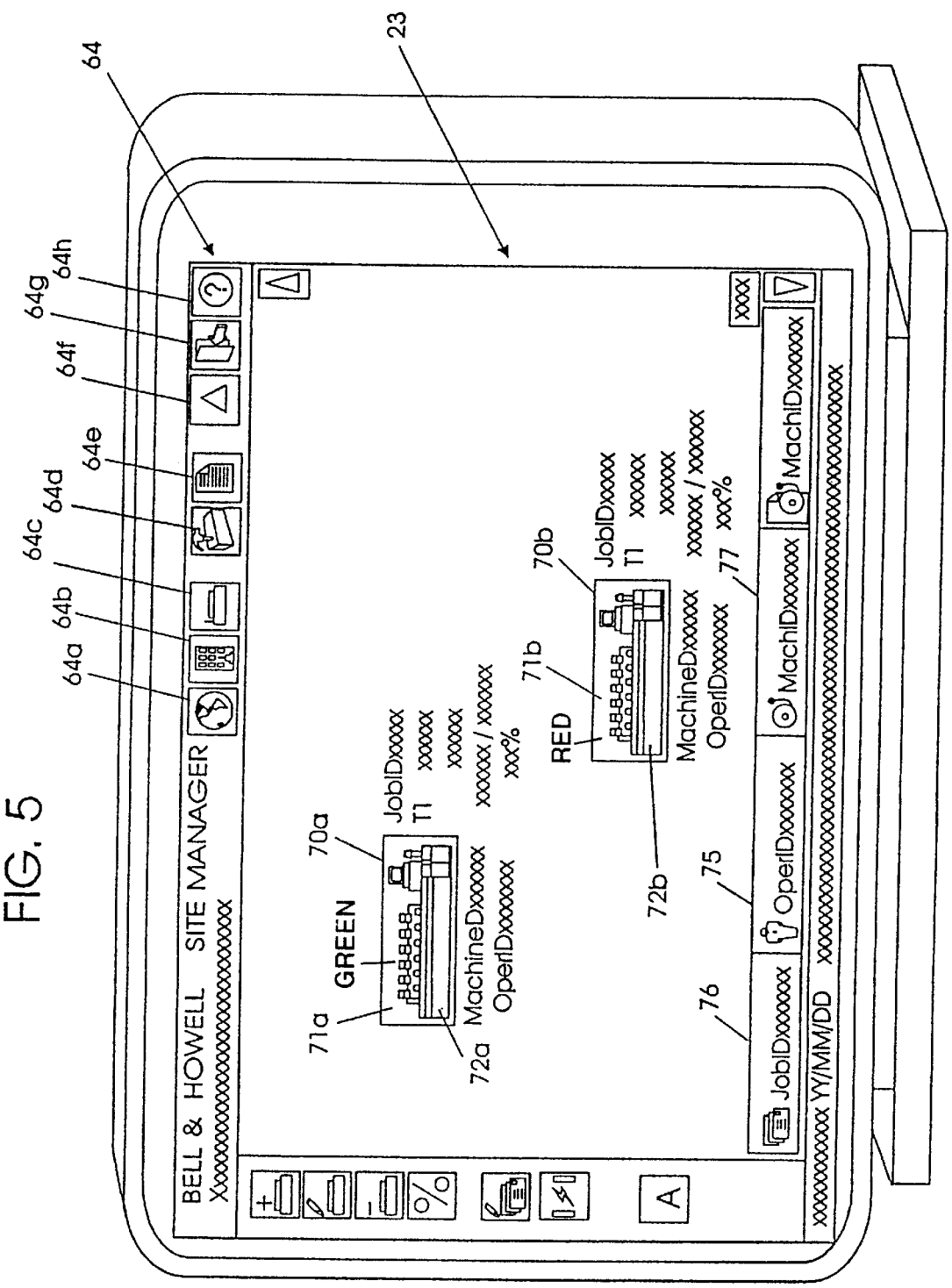
FIG. 5 illustrates a Site View screen according to the present invention.

Preferably, when the user "clicks on" or otherwise activates a site icon, a Site View screen is presented to the user for the site represented by the activated icon. A Site View screen displays the location of mail insertion machines at a selected site via machine icons. An exemplary Site View screen 23 is illustrated in FIG. 5, wherein two insertion machines are represented by machine icons 70a and 70b.

Preferably a maximum of twelve (12) mail insertion machines are displayed per Site View screen 23, not to exceed a total of one hundred (100) machines.

For each mail insertion machine at a site, the following information is preferably available via a respective machine icon: machine status, actual and goal throughput, actual and goal envelope counts, percent completion for the current run, the current operator identification, and the current job identification. Preferably, all mail insertion machine information is available and displayable in real time. It is understood that the term "real time" shall mean a minimal refresh rate of any screen of 30 seconds or less.

The operational status or condition of a particular mail insertion machine is discernable at all times by the color of indicia surrounding each machine icon. Accordingly, the user does not have to activate the machine icon to determine the operational status of a respective mail insertion machine. As illustrated in FIG. 5, each machine icon 70a, 70b has an area of indicia 71a, 71b immediately surrounding the graphic portion 72a, 72b of each machine icon that changes colors depending on the operating conditions of the particular insertion machine. Exemplary operating conditions and their respective colors are presented in Table 3 below.

TABLE 3

| Insertion Machine Operating Condition | Color Surrounding Machine Icon |
| --- | --- |
| Off | Background Color |
| Stopped | Grey |
| Running/Run Pending | Green |
| Jogging/Jog Pending | Yellow |
| Faulted/Insertion Machine Communications Failure | Red |
| Hold/Track Hold | Orange |
| Operator Break | Pink |
| Service | White |

In the illustrated embodiment, the words "GREEN" and "RED" in the indicia 71(a) and 71(b) represent colors that indicate the operational status of the mail insertion devices corresponding to icons 70a and 70b.

The present invention is not limited to color as a visual indication of insertion machine operational status. Operational status can be indicated by other visual schemes which change the display of an icon in response to actual machine operational condition changes. Machine status information available from Site View includes, but is not limited to, actual and goal throughput, actual and goal envelope counts, the percent complete for a current run, the current operator identification, and the current job identification number. The information that is displayed is the current information for the inserting machine and shows the progress being made on the job that is currently running on that machine.

Users in Site View can also arrange a series of machine icons to represent the physical layout of mail insertion machines. Icons can represent the type of insertion machine and indicate the type of communication protocols being utilized. The user can add, modify, and delete insertion machine icons at each site. When adding an insertion machine, the user is prompted for the following information: type of insertion machine, machine identification, machine name, and various network parameters.

Machine View

Figure 6:
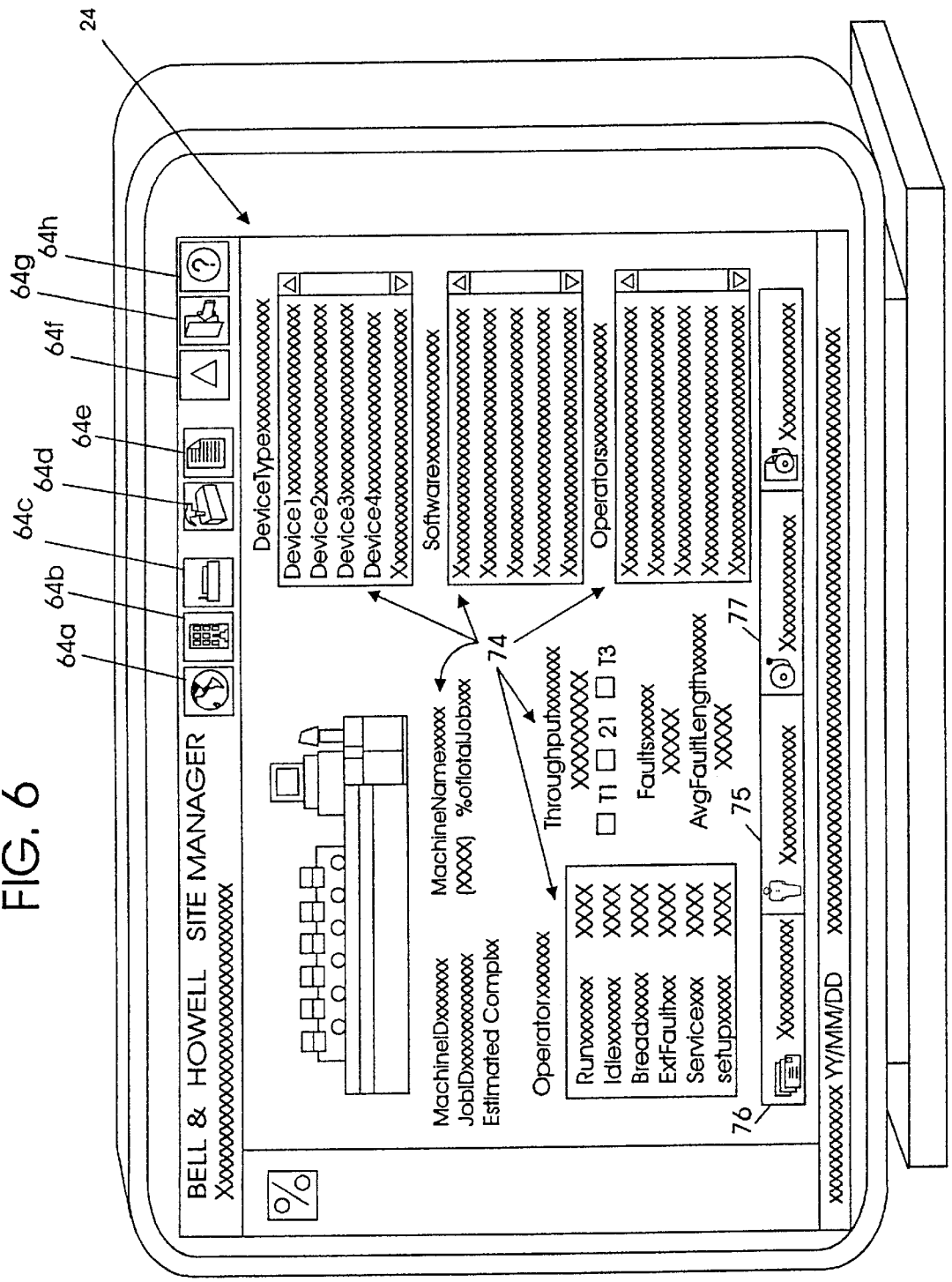
FIG. 6 illustrates a Machine View screen according to the present invention.

When the user double clicks or otherwise activates an interactive machine icon in the Site View screen 23, the Machine View screen 24, illustrated in FIG. 6, is presented for the mail insertion machine represented by that machine icon. Using the Machine View screen 24, the user is able to view various operational information 74 including, but not limited to, the following: machine status, actual and goal throughput, actual and goal envelope counts, estimated time to completion, the currently running job identification, the current fault count, the average fault length, a bar graph of time usage, device information, software package information and operator information. In addition, the user will be able to view the current T1, T2 or T3 formula results for each machine. As is known to those with skill in the art, for Advanced User Interface (AUI) type insertion machines (manufactured by Bell & Howell, Allentown, Pa., and Durham, N.C.), T1 is defined as a throughput calculation of "envelopes per hour" and is calculated using the following equation:

(run envelopes/(run time+fault time))*3600.

T2 is defined as a calculation of "percent utilization" and is calculated using the following equation:

(total envelopes*100)/(theoretical throughput).

For both T1 and T2, the following definitions apply:

total envelopes = run envelopes + jog envelopes
theoretical throughput =
(average run speed * (run time + jog time + fault time))/3600
average run speed = run machine cycles/(run time/3600).

For Inserter-Site Manager Connector (ISMC) insertion machines (manufactured by Bell & Howell) TI is defined as follows:

T1=((total envelopes-service envelopes)*3600)/(run time+fault time)

As is known by those skilled in the art, T2 is not calculated for ISMC insertion machines because the ISMC interface generally does not supply machine cycle information.

For both types of insertion machines, T3 is the user-defined formula, and can be configured in Site View for each site. The numerator is "run envelopes" and the denominator may be a sum of user selected time measurements. The user may select any or all of the following time measurements to be included in the denominator: run time, jog time, fault time, extended fault time, break time, service time, idle time, or suspend time. An exemplary T3 calculation is:

(run_envelopes/(run_time+jog_time+break_time))*3600

Other Screens and Windows

The following screens and pop-up windows are presented to the user when the user activates certain icons and/or automatically when certain events occur.

Operator at a Glance Pop-Up

Figure 7:
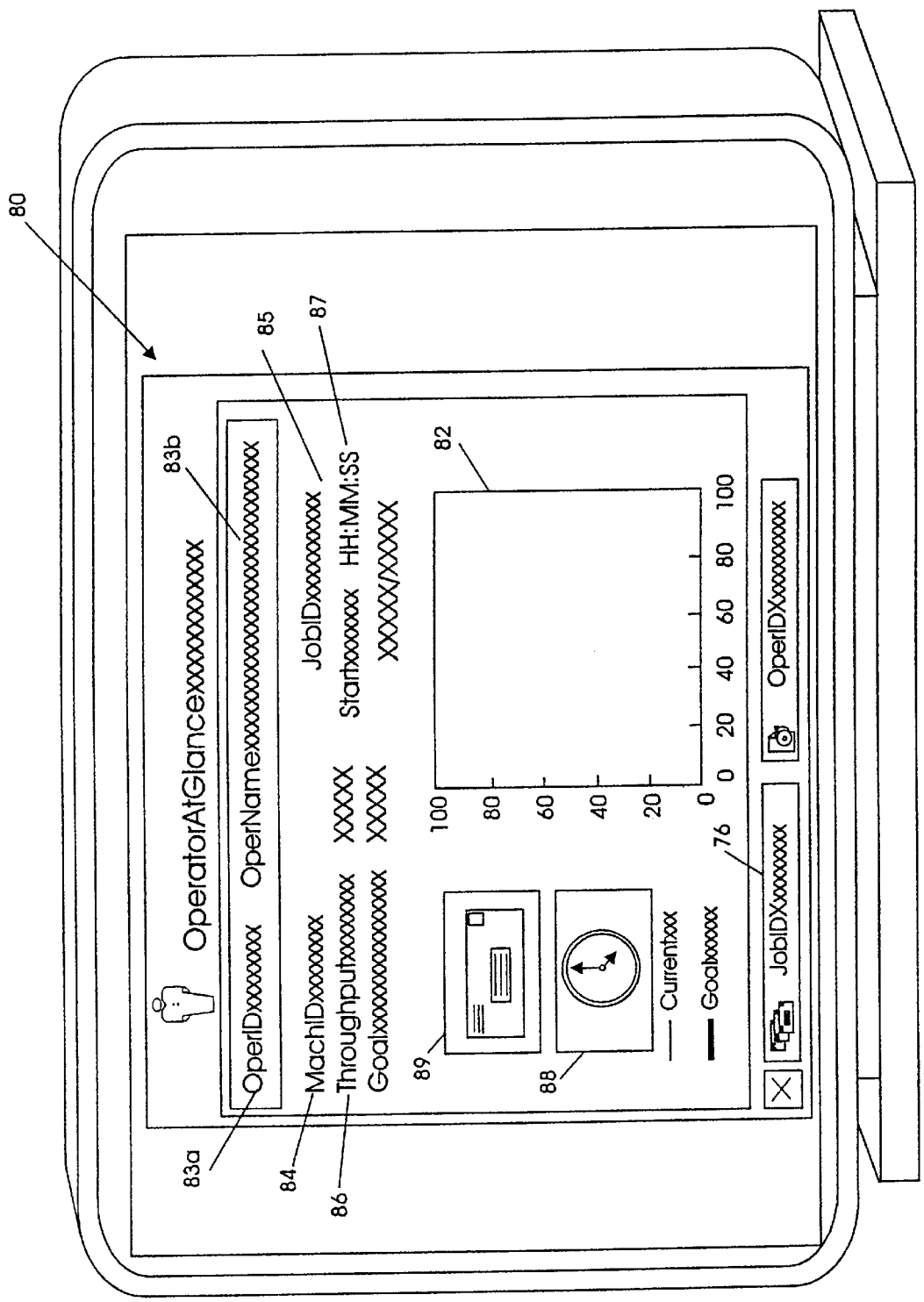
FIG. 7 illustrates an Operators at a Glance screen according to the present invention.

The "Operator at a Glance" pop-up view 80, illustrated in FIG. 7, is activated by clicking on the "Operator at a Glance" button 75 at the bottom of the Machine View and Site View screens (FIGS. 5 and 6), and is used to monitor insertion machine operator statistics, which are preferably displayed in a trend graph via window 82. Additional information displayed includes operator identification 83a, operator name 83b, machine identification 84, job identification 85, current throughput 86, and time job started 87. Current throughput and goal throughput can be displayed by clicking on the clock icon 88. Accounts processed and total accounts in job can be displayed by clicking on the envelope icon 89.

"Faults at a Glance" Pop-Up

Icons for providing fault and job information are preferably provided in both Machine View and Site View. In addition, a pop-up window is presented to the user for viewing occurrences of thresholds on groups of errors. The user can select this pop-up window (not shown) by clicking on the "Faults at a Glance" button 77 at the bottom of the Site View screen or Machine View screen.

Preferably, a pop-up window automatically appears on the user's display when a threshold is crossed, in order to alert the user to the particular condition. Information that is preferably displayed in such a window includes: identification of insertion machine having an error, error type, number of occurrences of error, total errors, total time lost, and average reset time. Preferably, the item that caused the threshold to trigger the pop-up window will be highlighted. For example, if a threshold was set for an average reset time of two (2) minutes and the average reset time calculated equals three (3) minutes, the "Faults at a Glance" pop-up window would appear on the user's display with the average reset time of three (3) minutes highlighted. If the user needs to see specific error occurrences, he/she can go to an Alarm Browser and filter the errors by machine identification or job identification.

"Percent to Goal" Pop-Up

Figure 8:
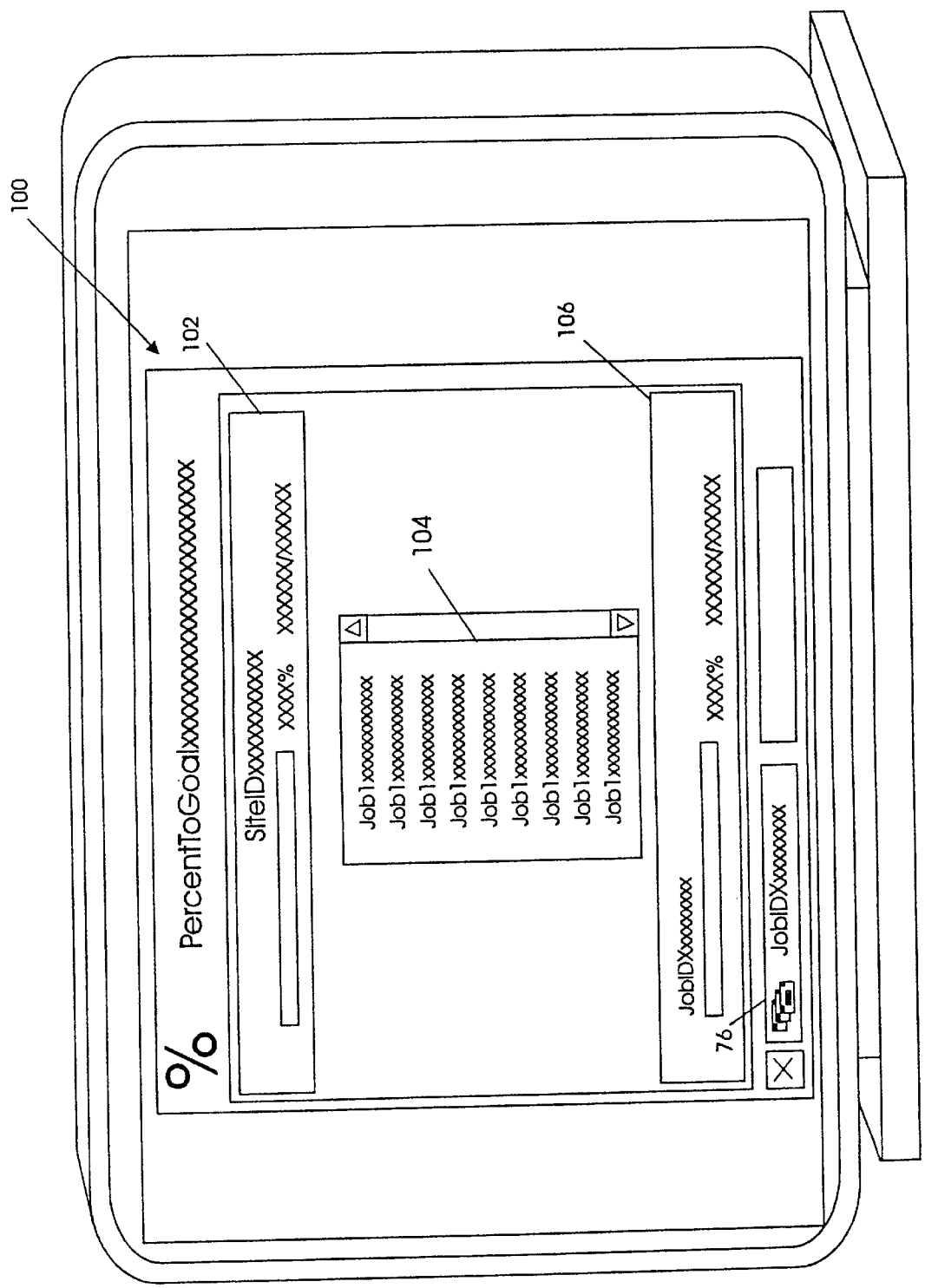
FIG. 8 illustrates a Percent to Goal screen according to the present invention.

A Percent to Goal pop-up window 100, illustrated in FIG. 8, appears when the user clicks on the "%" icon 62d in either Machine View or Site View, or automatically based on the user-defined threshold. The Percent to Goal pop-up permits the user to view current statistics. The top portion 102 displays all information pertaining to an entire site. Statistics for jobs currently running or completed during the current shift on the insertion machines at the site may be included in the top portion 102. A list 104 of jobs allows the user to select a job and view a summary of the selected job in the bottom portion 106 of the window 100.

"Job at a Glance" Pop-Up

Figure 9:
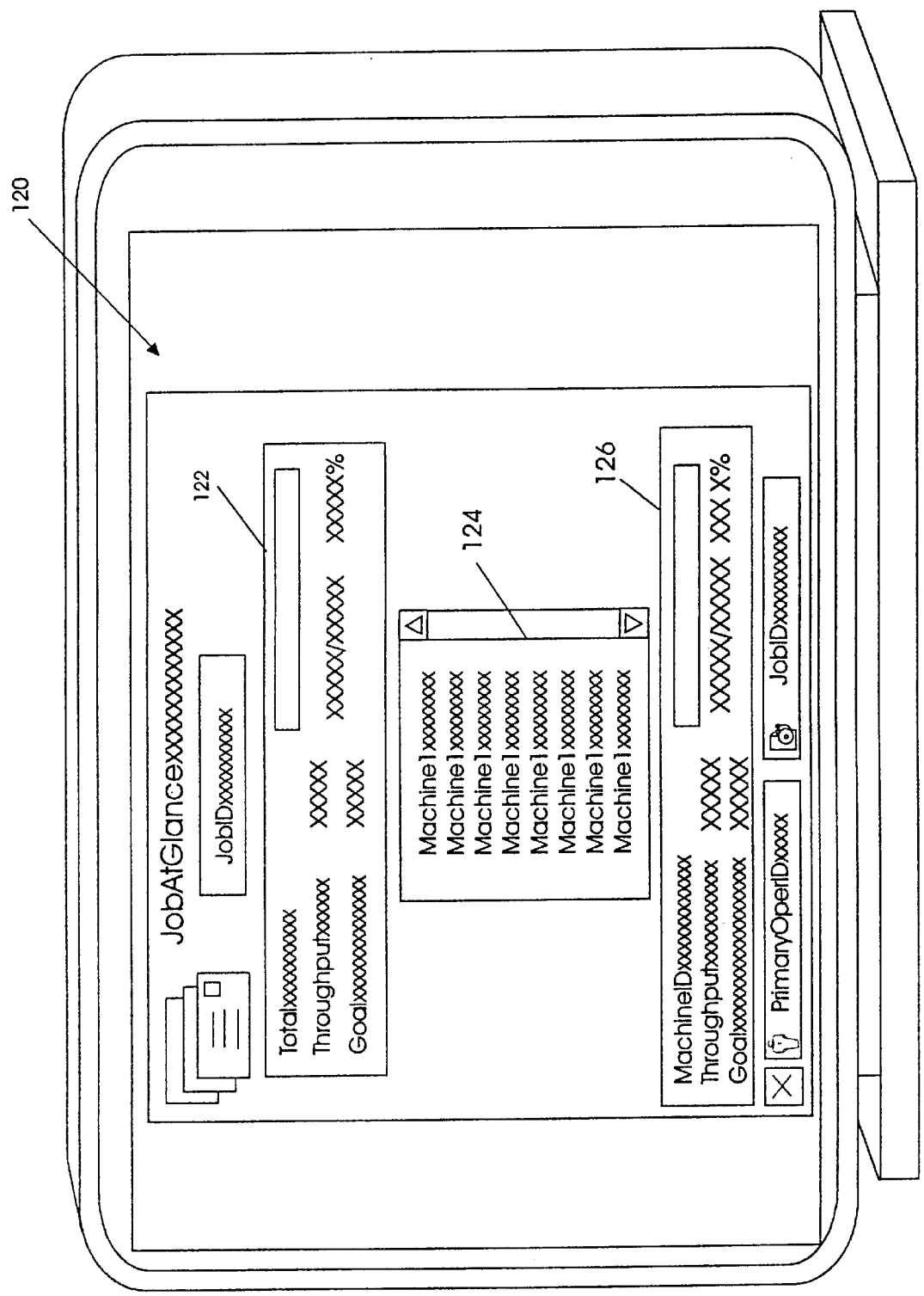
FIG. 9 illustrates a Job at a Glance screen according to the present invention.

A Job at a Glance pop-up window 120, illustrated in FIG. 9, appears when the user clicks on the "Job at a Glance" button 76 at the bottom of various screens. The top section 122 shows a summary of all elements of a job. The list 124 in the center portion of the window 120 contains all insertion machines running that particular job. When the user selects one of those insertion machines, details about the selected insertion machine will appear in the bottom section 126. Preferred information displayed in the bottom section 126 includes, but is not limited to: machine identification, operators running machine(s), current throughput, goal throughput, current accounts completed, and total accounts in job.

"User Administration"

Figure 10:
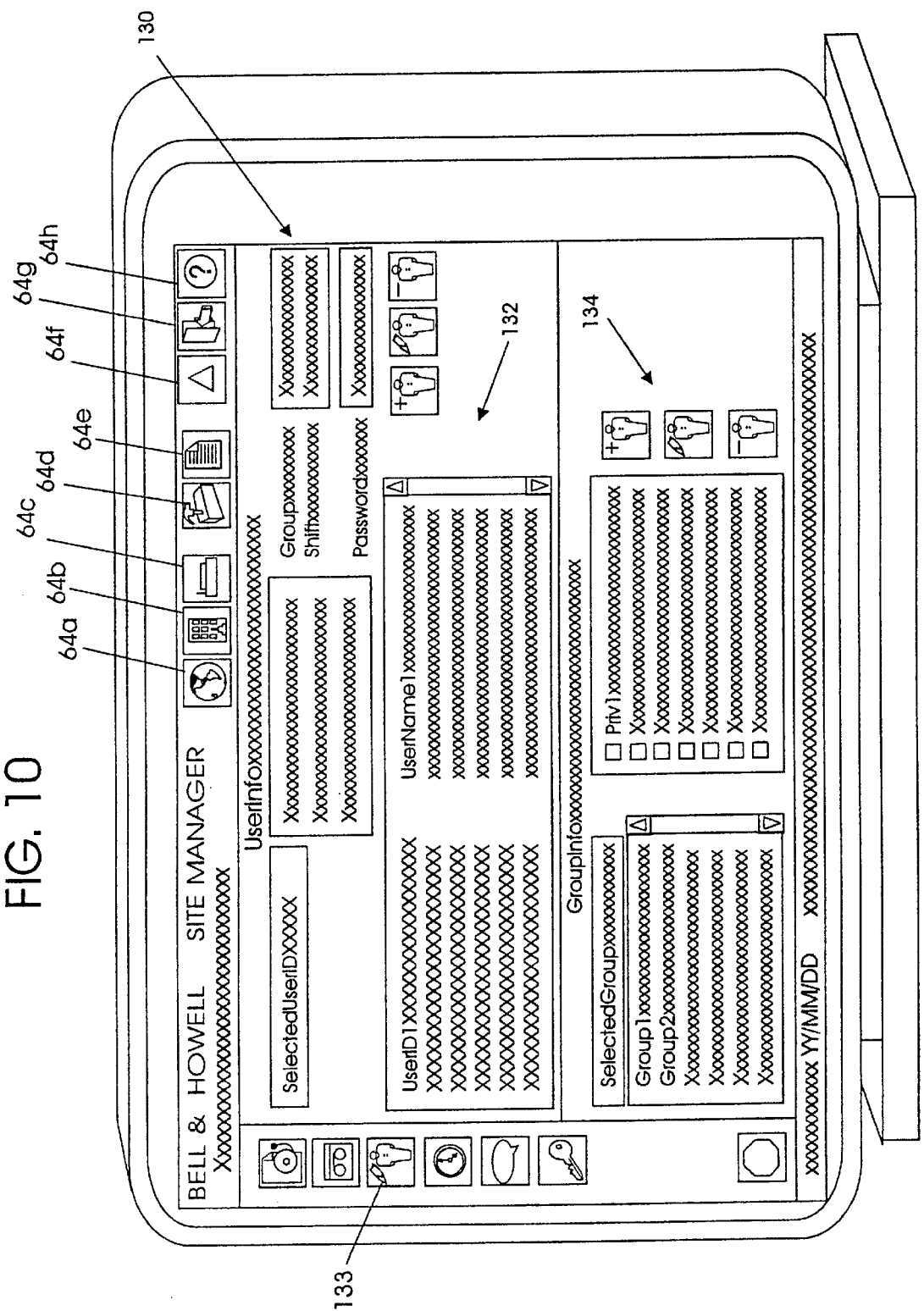
FIG. 10 illustrates a User Administration screen according to the present invention.
Figure 11:
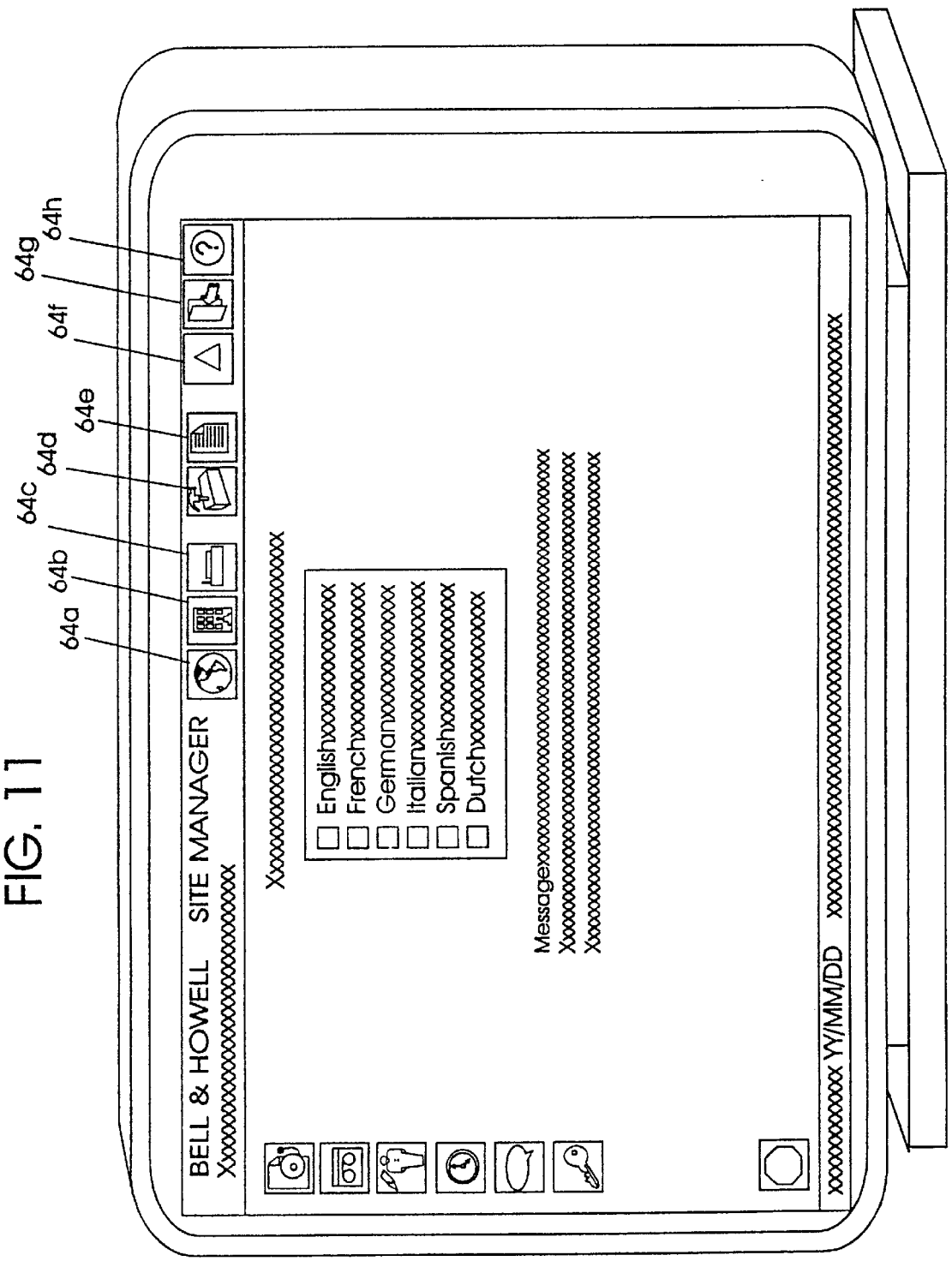

The User Administration utility screen 130, illustrated in FIG. 10, allows the user to add, edit, and delete users, including changing the security group of which the user is a member. The various tasks performed via the User Administration utility screen 130 may be activated by clicking on icon 133. The user will also be able to add, edit, and delete security groups and assign permission sets to each security group. In the illustrated embodiment, the top portion 132 of the screen 130 is used to configure the user's account. In the illustrated embodiment, the lower portion 134 of the screen 130 is used to configure security groups of users. Each security group preferably has a name and a set of designated privileges. The types of privileges include: status view, operator view, reports, alarm view, file transfer, edit configuration, job programming, maintain system, and edit users.

System Management and Utilities

The user may also be provided with various system management tools for data backup, insertion machine operator setup, and report generation. Various utilities may also be provided for performing a variety of functions including configuring user accounts, changing the display language, and configuring shift setups. The user can view individual occurrences of alarms from the mail insertion machines. Alarm messages preferably can be filtered either by job identification, insertion machine identification or both. These system management tools and utilities need not be described in detail.

Hardware and Software Requirements

The present invention can be implemented in a variety of communications environments including a Local Area Network (LAN) and Wide Area Network (WAN) environments. The present invention can be implemented in communications environments utilizing TCP/IP communications protocol, such as the Internet, and environments utilizing SNA protocol. Hardware for implementing the present invention is generally consistent with typical personal computing equipment, and does not generally require special environmental conditions other than a typical office environment. Preferably, the present invention is implemented on an International Business Machines (IBM) or IBM-compatible personal computer and software capable of supporting a thin wire Ethernet TCP/IP environment. Even more preferable is a server based on an Intel 486 or Pentium processor and having at least sixteen (16) megabytes of memory to perform all functions efficiently, and having data storage capacity of at least four (4) gigabytes. Also preferred is a printer suitable for text and color graphical report printing; automatic back-up capability for data and configuration files; and trackball or mouse support. The present invention may be implemented via other computing devices, including, but not limited to, mainframe computing systems and mini-computers. It is preferable to use a high resolution color display; however, a standard personal computer monitor may be used.

The present invention may be written in various computer languages including, but not limited to, C++, Smalltalk, Java, and other conventional programming languages such as BASIC, FORTRAN and COBOL. The present invention runs on current standard desktop computer platforms such as, but not limited to, Windows, Windows 95, Windows NT, UNIX, and OS/2. The present invention utilizes, in part, many standard features of current desktop configurations, such as the ability to store data locally, connect to the Internet, and display visual information.

Computer readable program code means is provided for receiving processing system operation related information from each of a plurality of mail insertion devices, and for representing each of the mail insertion devices as an interactive icon on a display connected to a data processing system. Each interactive icon has indicia associated therewith which displays the operation related information for a respective mail insertion device and changes appearance in response to a change in the operation related information. Computer readable program code means is provided for displaying selective operation related information about a respective mail insertion device in response to user actions, and for displaying operation related information for each mail insertion device in real time. Computer readable program code means is provided for selecting an interactive icon via an input device operatively connected to the data processing system, and for displaying operating status for the mail insertion device represented by the selected icon.

Computer readable program code means is provided for displaying the indicia surrounding an icon as a color selected from a plurality of colors, wherein each color represents an operational condition of a mail insertion device. Computer readable program code means is provided for displaying interactive icons in a manner depicting geographical locations of respective mail insertion devices. Computer readable program code means is also provided for adding, deleting, and modifying the location and appearance of the interactive icons.

The present invention is not limited in scope to systems, methods and computer program products for monitoring and controlling mail insertion machines. The present invention may be utilized for monitoring and controlling various mail processing systems including mail sorters, printers and other equipment related thereto. The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clause are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. A system for remote real-time monitoring of at least one mail insertion device, said system comprising:
   means for receiving operation related information from said mail insertion device at a location remote from said mail insertion device;
   a display operatively connected to said receiving means;
   operation related information display updating means for updating display of the operation related information in real time; and
   icon display means responsive to said receiving means for representing said mail insertion device as an interactive icon on said display, said interactive icon having an indicium associated therewith which displays the operation related information for a respective mail insertion device and which changes appearance in response to a change in the operation related information.

2. A system according to claim 1 wherein each interactive icon is responsive to user actions for displaying selected operation related information about a respective mail insertion device.

3. A system according to claim 1 wherein said indicium is displayed in a color selected from a plurality of colors, each of said plurality of colors representing a respective operational condition of a mail insertion device.

4. A system according to claim 1 wherein said icon display means comprises means for displaying a plurality of said interactive icons on said display in a manner depicting geographical location of said mail insertion device.

5. A system according to claim 1 further comprising means for adding and deleting interactive icons from said display.

6. A system according to claim 1 further comprising means for modifying the location and appearance of each of said interactive icons on said display.

7. The method of claim 1 wherein said operation related information display updating means updates display of the operation related information at a rate of at least about one update per thirty seconds.

8. The system of claim 1 wherein said means for receiving operation related information receives operation related information from a plurality of remotely located mail insertion devices and said operation related information display updating means updates display of operation related information for said plurality of mail insertion devices in real time.

9. A method for remote real-time monitoring of at least one mail insertion device, said method comprising:
   receiving operation related information from said mail insertion device from a location remote from said mail insertion device;
   representing said mail insertion device as an interactive icon on a display, said interactive icon having an indicium associated therewith which displays the operation related information for said mail insertion device and changes appearance in response to a change in the operation related information; and
   updating display of the operation related information for said mail insertion device in real time.

10. A method according to claim 9 wherein said indicium comprises a plurality of colors, each of said colors representing operational status of a mail insertion device.

11. A method according to claim 9 wherein representing said mail insertion device as an interactive icon comprises displaying said icon in a manner depicting a geographical location of said mail insertion device.

12. The method of claim 9 wherein updating display of the operation related information includes updating display of the operation related information at a rate of at least about one update per thirty seconds.

13. The method of claim 9 wherein receiving operation related information includes receiving operation related information from a plurality of remotely located mail insertion devices and updating display of the operation related information comprises updating display of the operation related information for said plurality of mail insertion devices in real time.

14. A computer program product for use with a data processing system for remote real-time monitoring of at least one mail insertion device, said computer program product comprising:
   a computer usable medium having computer readable program code means embodied in said medium for receiving processing system operation related information from said mail insertion device;
   the computer usable medium having computer readable program code means embodied in said medium for representing said mail insertion device as an interactive icon in a display connected to said data processing system, said interactive icon having an indicium associated therewith which displays the operation related information for said mail insertion device and changes appearance in response to a change in the operation related information; and
   the computer usable medium having computer readable program code means embodied in said medium for updating display of the operation related information for said mail insertion device in real time.

15. A computer program product according to claim 14, wherein said computer readable program code means for representing said mail insertion device as an interactive icon comprises computer readable program code means, embodied in said medium, for displaying selected operation related information about said mail insertion device in response to user actions.

16. A computer program product according to claim 14, wherein said computer readable program code means for representing said mail insertion device as an interactive icon comprises computer readable program code means, embodied in said medium, for displaying said indicium as a color selected from a plurality of colors, each of said plurality of colors representing a respective operational condition of said mail insertion device.

17. A computer program product according to claim 14, wherein said computer readable program code means for representing said mail insertion device as an interactive icon comprises computer readable program code means, embodied in said medium, for displaying said interactive icons on said display in a manner depicting geographical location of said mail insertion device.

18. A computer program product according to claim 14, wherein said computer readable program code means for representing said mail insertion device as an interactive icon comprises computer readable program code means, embodied in said medium, for adding and deleting interactive icons from said display.

19. A computer program product according to claim 14, wherein said computer readable program code means for representing said mail insertion device as an interactive icon comprises computer readable program code means, embodied in said medium, for modifying the location and appearance of said interactive icon on said display.

20. The computer program product of claim 14 wherein said computer program code means for updating display of the operation related information includes computer program code means for updating display of the operation related information at a rate of at least about one update per thirty seconds.

21. The computer program product of claim 14 wherein said computer readable program code means for receiving processing system operation related information includes computer readable program code means for receiving processing system operation related information from a plurality of mail insertion devices and said computer readable program code means for updating display of the operation related information includes computer readable program code means for updating display of the operation related information for said plurality of mail insertion devices in real time.

22. A system for remote real-time monitoring of at least one mail insertion device, said system comprising:

means for receiving operation related information from said mail insertion device from a location remote from said mail insertion device;

a display operatively connected to said receiving means;

an input device operatively connected to said receiving means;

icon display means for representing said mail insertion device as an interactive icon on said display, each interactive icon having an indicium associated therewith which displays the operation related information for said mail insertion device and changes appearance in response to a change in the operation related information;

mail insertion device operating status input accepting means for accepting selection of said interactive icon via said input device;

mail insertion device operating status display means for displaying, on said display device, operating status for said mail insertion device; and operation related information display updating means for updating display of the operation related information for said mail insertion device in real time.

23. A system according to claim 22 wherein said mail insertion device operation status display means comprises means for displaying operating status for said mail insertion device in real time.

24. A system according to claim 22 wherein said indicium is displayed in a color selected from a plurality of colors, each of said plurality of colors representing a respective operational condition of said mail insertion device.

25. A system according to claim 22 wherein said icon display means comprises means for displaying said interactive icon on said display in a manner depicting geographical location of said mail insertion device.

26. A system according to claim 22 wherein said data processing means includes means for adding and deleting interactive icons from said display.

27. A system according to claim 22 further comprising means for modifying the location and appearance of said interactive icon on said display.

28. A system according to claim 22 wherein said mail insertion device operating status display means further comprises means for displaying a window on said display, the window including at least one list of information related to a respective mail insertion device.

29. The system of claim 22 wherein said operation related information display updating means updates display of the operation related information at a rate of at least about one update per thirty seconds.

30. The system of claim 22 wherein said means for receiving operation related information receives operation related information from a plurality of mail insertion devices and said operation related information display updating means updates display of the operation related information for said plurality of mail insertion devices in real time.

31. A method for real-time remote monitoring of at least one mail insertion device, said method comprising:

receiving operation related information from said mail insertion device from a location remote from said mail insertion device;

representing said mail insertion device as an interactive icon on a display, said interactive icon having an indicium associated therewith which displays the operation related information for said mail insertion device and changes appearance in response to a change in the operation related information;

accepting selection of said interactive icon via an input device;

displaying, on said display, operating status said mail insertion device; and updating display of the operation related information for said mail insertion device in real time.

32. A method according to claim 31 wherein said step of displaying operating status for a selected one of said mail insertion devices comprises displaying said operating status in real time.

33. A method according to claim 31 wherein said indicium comprises a plurality of colors, each of said colors representing operational status of said mail insertion device.

34. A method according to claim 31 wherein representing said mail insertion as an interactive icon comprises displaying said icon in a manner depicting geographical location of said mail insertion device.

35. A method according to claim 31 wherein displaying operating status for said mail insertion device comprises displaying a window on said display, the window including at least one list of information related to a respective mail insertion device.

36. The method of claim 31 wherein updating display of the operation related information of said mail insertion device in real time comprises updating display of the operation related information at a rate of at least about one update per thirty seconds.

37. The method according to claim 31 wherein receiving said operation related information includes receiving operation related information from a plurality of mail insertion devices and updating display of the operation related information includes updating display of the operation related information from said plurality of mail insertion devices in real time.

38. A computer program product for use with a data processing system for remote real-time monitoring of at least one mail insertion device, said computer program product comprising:

a computer usable medium having computer readable program code means embodied in said medium for receiving operation related information from said mail insertion device;

the computer usable medium having computer readable program code means embodied in said medium for representing said mail insertion device as an interactive icon on a display operatively connected to said data processing system, said interactive icon having an indicium associated therewith which displays the operation related information for said mail insertion device and changes appearance in response to a change in the operation related information;

the computer usable medium having computer readable program code means embodied in said medium for accepting selection of said interactive icon via an input device operatively connected to said data processing system;

the computer usable medium having computer readable program code means embodied in said medium for displaying, on said display, operating status for said mail insertion device; and the computer usable medium having computer readable program code means for updating display of the operation related information for said mail insertion device in real time.

39. A computer program product according to claim 38, wherein said computer readable program code means for displaying operating status for said mail insertion device comprises means for displaying operating status in real time.

40. A computer program product according to claim 38, wherein said computer readable program code means for representing said mail insertion device as an interactive icon comprises computer readable program code means, embodied in said medium, for displaying said indicium in a color selected from a plurality of colors, each of said plurality of colors representing a respective operational condition of a mail insertion device.

41. A computer program product according to claim 38, wherein said computer readable program code means for representing said mail insertion device as an interactive icon comprises computer readable program code means, embodied in said medium for displaying said interactive icon on said display in a manner depicting geographical location of said mail insertion device.

42. A computer program product according to claim 38, wherein said computer readable program code means for representing said mail insertion device as an interactive icon comprises computer readable program code means, embodied in said medium, for adding and deleting interactive icons from said display.

43. A computer program product according to claim 38, wherein said computer readable program code means for representing said mail insertion device as an interactive icon comprises computer readable program code means, embodied in said medium, for modifying the location and appearance of said interactive icon on said display.

44. A computer program product according to claim 38, wherein said computer readable program code means for displaying mail insertion device operating status comprises computer readable program code means, embodied in said medium for displaying a window on said display, the window including at least one list of information related to said mail insertion device.

45. The computer program product of claim 38 wherein said computer readable program code means for updating display of the operation related information for said mail insertion device in real time comprises computer readable program code means for updating display of the operation related information at a rate of at least about one update per thirty seconds.

46. The computer program product of claim 38 wherein said computer readable program code means for receiving operation related information includes computer readable program code means for receiving operation related information from a plurality of mail insertion devices and said computer readable program code means for updating display of the operation related information includes computer readable program code means for updating display of the operation related information in real time.

47. A system for real-time remote monitoring of at least one mail processing device, said system comprising:

means for receiving operation related information from said mail processing device from a location remote from said mail processing device;

a display operatively connected to said receiving means;

operation related information display updating means for updating display of the operation related information of said mail processing device in real time; and icon display means responsive to said receiving means for representing said mail processing device as an interactive icon on said display, said interactive icon having an indicium associated therewith which displays the operation related information for said mail processing device and which changes appearance in response to a change in the operation related information.

48. A system according to claim 47 wherein each interactive icon is responsive to user actions for displaying selective operation related information about a respective mail processing device.

49. A system according to claim 47 wherein said indicium is displayed in a color selected from a plurality of colors, each of said plurality of colors representing a respective operational condition of a mail processing device.

50. A system according to claim 47 wherein said icon display means comprises means for displaying said interactive icon on said display in a manner depicting geographical location of said mail processing device.

51. A system according to claim 47 further comprising means for adding and deleting interactive icons from said display.

52. A system according to claim 47 further comprising means for modifying the location and appearance of said interactive icon on said display.

53. The system of claim 47 wherein said operating related information display updating means updates display of the operation related information at a rate of at least about one update per thirty seconds.

54. The system of claim 47 wherein said means for receiving operation related information includes means for receiving operation related information from a plurality of mail processing devices and said operation related information display updating means includes means for updating display of the operation related information from said plurality of mail processing devices in real time.

55. A system for real time remote monitoring of at least one mail processing device, said system comprising:

receiving means located remotely from said mail processing device for receiving operation related information from said mail processing device;

operation related information display updating means for updating display of the operation related information in real time;

threshold receiving means for receiving a threshold from a user associated with the operation related information;

threshold exceeded display means for automatically alerting the user when the operation related information crosses the threshold; and interactive icon display means for representing said mail processing device as an interactive icon.

56. The system of claim 55 comprising filtering means for filtering display of occurrences of threshold crossings according to mail processing device identification or mail processing job identification.

57. The system of claim 55 wherein said operation related information display updating means updates display of the operation related information at a rate of at least about one update per thirty seconds.

58. The system of claim 55 wherein said receiving means includes means for receiving operation related information from a plurality of mail processing devices and said threshold exceeded display means includes means for automatically alerting the user when the operation related information from any of said plurality of mail processing devices crosses the threshold.

59. The system of claim 55 wherein said threshold exceeded display means comprises a pop-up window for displaying a condition that caused crossing of the threshold.

60. The system of claim 59 wherein the pop-up window comprises means for identifying a mail processing device for which the threshold was crossed.

* * * * *